United States Patent [19]

Goossens

[11] 4,189,417

[45] Feb. 19, 1980

[54] PROCESS FOR THE POLYMERIZATION OF ALKENYL AROMATIC MONOMERS IN THE PRESENCE OF POLYPHENYLENE OXIDES

[75] Inventor: John C. Goossens, Mt. Vernon, Ind.

[73] Assignee: General Electric Company, Pittsfield, Mass.

[21] Appl. No.: 863,669

[22] Filed: Dec. 23, 1977

[51] Int. Cl.$^2$ .................................................. C08L 25/06
[52] U.S. Cl. ..................... 260/29.6 NR; 260/29.7 NR; 525/392
[58] Field of Search ............... 260/874, 887, 29.6 NR, 260/29.7 NR

[56] References Cited

U.S. PATENT DOCUMENTS

| | | | |
|---|---|---|---|
| 3,356,761 | 12/1967 | Fox | 260/874 |
| 3,384,682 | 5/1968 | Erchak et al. | 260/874 |
| 3,487,127 | 12/1969 | Erchak et al. | 260/876 R |
| 3,664,977 | 5/1972 | Makanishi et al. | 260/876 R |
| 3,700,630 | 10/1972 | Hamada et al. | 260/17.2 S |
| 3,700,750 | 10/1972 | Yamanouchi et al. | 260/874 |
| 3,751,388 | 8/1973 | Tabana et al. | 260/23 S |
| 3,862,263 | 1/1975 | Maruta et al. | 260/874 |

FOREIGN PATENT DOCUMENTS

| | | | |
|---|---|---|---|
| 1939033 | 2/1970 | Fed. Rep. of Germany | 260/874 |
| 2126434 | 7/1973 | Fed. Rep. of Germany | 260/874 |

*Primary Examiner*—Maurice J. Welsh
*Attorney, Agent, or Firm*—Morgan, Finnegan, Pine, Foley & Lee

[57] ABSTRACT

An improved process is described for the polymerization of alkenyl aromatic monomers in the presence of a polyphenylene oxide wherein the improvement comprises carrying out the process in the presence of alumina, a monobasic acid anhydride, water or a mixture of alumina and water.

10 Claims, No Drawings

PROCESS FOR THE POLYMERIZATION OF ALKENYL AROMATIC MONOMERS IN THE PRESENCE OF POLYPHENYLENE OXIDES

This invention provides an improved process for the polymerization of an alkenyl aromatic monomer in the presence of a polyphenylene oxide wherein the improvement comprises carrying out the process in the presence of alumina, a monobasic acid anhydride, water or a mixture of water and alumina.

BACKGROUND OF THE INVENTION

Compositions of polyphenylene oxides and alkenyl aromatic resins are known in the art. The polyphenylene oxides are disclosed in Hay, U.S. Pat. No. 3,306,874 and U.S. Pat. No. 3,306,875, and in Stamatoff, U.S. Pat. Nos. 3,257,357 and 3,357,358. In the Hay patents, the polyphenylene oxides are prepared by an oxidative coupling reaction comprising passing an oxygen-containing gas through a reaction solution of a phenol and a metal-amine complex catalyst. Other disclosures relating to processes for preparing polyphenylene oxide resins, including graft copolymers of polyphenylene oxide resins with styrene type compounds, are found in Fox, U.S. Pat. No. 3,356,761; Sumitomo, U.K. Pat. No. 1,291,609; Bussink et al U.S. Pat. No. 3,337,499; Blanchard et al, U.S. Pat. No. 3,219,626; Laakso et al, U.S. Pat. No. 3,342,892; Borman, U.S. Pat. No. 3,344,166; Hori eta al, U.S. Pat. No. 3,384,619; Faurote et al, U.S. Pat. No. 3,440,217; Olander, U.S. Pat. No. 3,956,242; and disclosures relating to metal based catalysts which do not include amines, are known from patents such as Wieden et al, U.S. Pat. No. 3,442,885 (copper-amidines); Nakashio et al, U.S. Pat. No. 3,573,257 (metal-alcoholate or -phenolate); Kobayashi et al, U.S. Pat. No. 3,455,880 (cobalt chelates); and the like. In the Stamatoff patents, the polyphenylene ethers are produced by reacting the corresponding phenolate ion with an initiator, such as a peroxy acid salt, an acid peroxide, a hypohalite, and the like, in the presence of a complexing agent. Disclosures relating to non-catalytic processes, such as oxidation with lead dioxide, silver oxide, etc., are described in Price et al, U.S. Pat. No. 3,382,212. Cizek, U.S. Pat. No. 3,383,435 discloses polyphenylene oxide resin compositions. All of the above-mentioned disclosures are incorporated by reference.

Alkenyl aromatic resins have been prepared by polymerizing an appropriate alkenyl aromatic monomer in the presence of a polyphenylene oxide resin. Disclosures of such processes are found in Tabana et al, U.S. Pat. No. 3,751,388; Erchak et al, U.S. Pat. No. 3,384,682; Erchak et al, U.S. Pat. No. 3,487,127; Yamanouchi et al, 3,700,650; and Nakanishi et al, U.S. Pat. No. 3,664,977. It has been found that impurites in polyphenylene oxide resins, such as catalyst residues have had an adverse effect on the polymerization rates of alkenyl aromatic monomers such as styrene, when these monomers have been polymerized in the presence of polyphenylene oxide resins. The applicant has discovered that the speed of polymerization and/or the ultimate molecular weight of the alkenyl aromatic resin may be raised by the addition to the polymerization reaction of alumina, a monobasic acid anhydride, water or a mixture of water and alumina.

Accordingly, it is a primary object of the present invention to provide an improved process for the polymerization of alkenyl aromatic monomers in the presence of a polyphenylene oxide resin.

DETAILED DESCRIPTION OF THE INVENTION

The present invention provides an improved process for the polymerization of alkenyl aromatic monomers in the presence of a polyphenylene oxide. The improved process comprises adding to the reaction mixture which comprises an alkenyl aromatic monomer and a polyphenylene oxide, an amount of alumina, a monobasic acid anhydride, water or a mixture of water and alumina in an amount that is sufficient to accelerate the polymerization of the alkenyl aromatic monomer.

The term "polyphenylene oxide" is employed to include oxidatively coupled phenolic monomers of the formula:

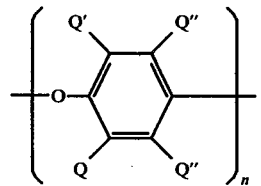

where Q is selected from the group consisting of hydrogen, hydrocarbon, halo-hydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus, $Q'$ and $Q''$ are the same as Q and in addition may be halogen with the proviso that Q, $Q'$ and $Q''$ are all free of a tertiary carbon atom, and n is at least 50.

The preferred polyphenylene oxide is poly(2,6-dimethyl-1,4-phenylene oxide) having an intrinsic viscosity of from about 0.3 dl/g. to about 0.7 dl/g. as measured in chloroform at a temperature of 30° C.

The alkenyl aromatic monomer is preferably of the formula:

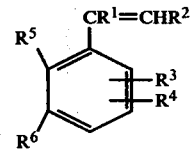

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group. These monomers are free of any substituent having a tertiary carbon atom.

The preferred alkenyl aromatic monomers include styrene and monochlorostyrene. These monomers may also be copolymerized with suitable additives to form rubber modified, high impact polystyrene such as butadiene rubber modified polystyrene, styrene acrylonitrile copolymer, styrene butadiene copolymers, styrene maleic anhydride copolymers, copolymers of ethylvinylbenzene and the like.

The process of the invention may be carried out by dissolving the polyphenylene oxide in an appropriate solvent or directly in the alkenyl aromatic monomer. The additives may be added and a thermal polymerization may be carried out by heating the mixture to a temperature at which the polymerization of the alkenyl aromatic monomer will take place.

The additive may comprise finely divided alumina that is preferably an activated aluminum oxide of the type suitable for chromatographic adsorption. This type of aluminum oxide may be prepared from carefully screened aluminum hydroxide having a typical sieve analysis of all through 150 mesh; 40%—200 mesh and 40%—325 mesh. The aluminum oxide is dehydrated and calcined at about 900° C. in a carbon dioxide stream which tends to coat the individual Al₂O₃ particles with a thin layer of aluminum oxycarbonate. Water content and alkalinity may be adjusted with dilute acids.

Generally from about 0.05 to about 0.1 parts by weight of alumina per part by weight alkenyl aromatic monomer may be employed in the practice of the invention.

The preferred monobasic acid anhydride may be selected from compounds having the formula:

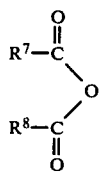

wherein $R^7$ and $R^8$ are independently selected from the group consisting of alkyl, aryl, arylalkyl and alkaryl groups having from 1 to 30 carbon atoms. Examples of these substituents include methyl, ethyl, n-propyl, n-butyl, n-hexyl, phenyl, phenethyl benzyl, p-ethylphenyl, naphthyl and the like.

The especially preferred monobasic acid anhyrides are acetic anhydride and benzoic anhydride. Generally one may employ from about 0.01 to about 0.1 parts by weight of monobasic acid anhydride per part of alkenyl aromatic monomer.

Water may be employed at from about 0.01 to about 0.25 parts by weight per part of alkenyl aromatic monomer.

From 1 to 99 parts by weight and more preferably 20 to 40 parts by weight of the polyphenylene oxide is combined with 99 to 1 parts by weight and more preferably from 80 to 60 parts by weight of the alkenyl aromatic monomer in the practice of the invention.

The polymer may be recovered from the reaction mixture in accordance with the standard procedures.

DESCRIPTION OF THE PREFERRED EMBODIMENTS

The following examples illustrate the invention. These examples are merely illustrative and are not to be construed to limit the invention in any manner whatsoever.

EXAMPLE 1

A 100 ml glass resin pot, equipped with a stirrer was charged with 50 g of a 65/35 mixture of monomeric styrene and poly(2,6-dimethyl-1,4-phenylene oxide) having an intrinsic viscosity of about 0.5 dl/g as measured in chloroform at 30° C. The styrene was polymerized by heating the resin pot to 140° C. for 3 hours. If an additive was employed, it was added at the start of the polymerization reaction. The results are listed in Table I.

TABLE I

| Amount of Additive | Conversion to Polystyrene | Intrinsic Viscosity of Polystyrene*(dl/g) |
|---|---|---|
| None | 45% | 0.54 |
| 0.4% acetic anhydride | — | 0.55 |
| 1.0% acetic anhydride | — | 0.63 |
| 2.0% acetic anhydride | — | 0.70 |
| 2.0% benzoic anhydride | 45% | 0.50 |
| 6.0% benzoic anhydride | 55% | 0.57 |

*as measured in CHCl₃ at 25° C.

The polymerizations in the presence of acetic anhydride went to such a high viscosity in 3 hours that the product could not be sampled readily for determination of conversion to polystyrene. It was estimated that the conversions were in excess of 65%.

The acetic anhydride promoted polymerizations were repeated allowing the reaction to proceed at 140° C. for one hour. The results are reported in Table II:

TABLE II

| Amount of Additive | Conversion of Polystyrene |
|---|---|
| None | 30% |
| 0.4% acetic anhydride | 30% |
| 2.0% acetic anhydride | 38% |

EXAMPLE 2

A 100 ml glass resin pot was employed to prepare 50 g of a 35/65 weight blend of poly(2,6-dimethyl-1,4-phenylene oxide) as employed in Example 1 and monomeric styrene. The stirred mixture was polymerized by heating for 3 hours at 140° C. The polystyrene so formed was isolated and its molecular weight was calculated fron the intrinsic viscosity. The results are reported in Table 3.

TABLE 3

| Poly(2,6-dimethyl-1,4-phenylene oxide) | Alumina* | I.V.** |
|---|---|---|
| 1. Prepared by extraction of copper-amine catalyst residue with ethylenediamine tetracetic acid | None | 0.40 |
| 2. Prepared by extraction of copper-amine catalyst residue with ethylenediamine tetracetic acid | 3.0 g | 0.62 |
| 3. Prepared by antisolvent precipitation of copper-amine catalyzed polymerization | None | 0.56 |
| 4. Prepared by antisolvent precipitation of copper-amine catalyzed polymerization | 1.5 g | 0.63 |
| 5. Prepared by antisolvent precipitation of copper-amine catalyzed polymerization | 5.0 g | 0.67 |

*chromatographic grade
**dl/g as measured in chloroform at 25° C.

EXAMPLE 3

The polymerizations were carried out in 100 ml glass resin pots. The reaction mixture was a blend of 50 g of a 65/35 mixture of monomeric stryene and poly(2,6-dimethyl-1,4-phenylene oxide) as employed in Example 1. In each case run, the intrinsic viscosity was measured after 3 hours at 140° C. The results are reported in Table 4:

TABLE 4

| | Catalyst* | Additive | Water Added | IV** |
|---|---|---|---|---|
| 1. | copper-amine | None | no | 0.58 |
| 2. | copper-amine | 5% alumina | no | 0.57 |
| 3. | copper-amine | 5% alumina | yes | 0.64 |
| 4. | copper-amine | None | no | 0.54 |
| 5. | copper-amine | 1% alumina | no | 0.54 |
| 6. | copper-amine | 1% alumina | yes | 0.62 |
| 7. | copper-amine | 4% Hisil 233*** | no | 0.52 |
| 8. | copper-amine | 4% Hisil 233 | yes | 0.57 |
| 9. | copper-amine | 1% ZnO | no | 0.52 |
| 10. | copper-amine | 1% ZnO | yes | 0.57 |
| 11. | copper-amine | 0.4% dibutyl amine | no | 0.54 |
| 12. | copper-amine | 0.4% dibutyl amine | yes | 0.57 |
| 13. | manganese | None | no | 0.52 |
| 14. | manganese | None | yes | 0.59 |
| 15. | $POCl_3$ | None | no | 0.72 |
| 16. | $POCl_3$ | None | yes | 0.84 |

*refers to catalyst employed in polymerization of poly(2,6-dimethyl-1,4-phenylene oxide)

**dl/g as measured in chloroform at 25° C.

***Precipitated silica PPG.

Although the above examples have shown various modifications of the present invention, other variations are possible in light of the above teachings. It is, therefore, to be understood that changes may be made in the particular embodiments of the invention which are within the full intended scope of the invention as defined by the appended claims.

I claim:

1. In a process for the polymerization of an alkenyl aromatic monomer in the presence of a solution of a polyphenylene oxide, the improvement which comprises adding to the polymerization mixture an amount of an additive selected from the group which consists of alumina, a monobasic acid anhydride, and mixtures of alumina and water, said amount being sufficient to accelerate the polymerization of the alkenyl aromatic monomers.

2. The process of claim 1 wherein the polyphenlene oxide is of the formula:

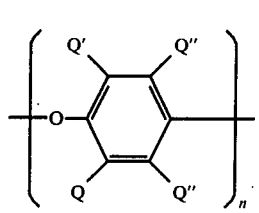

wherein Q is selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus, Q' and Q" are the same as Q and in addition may be halogen with the proviso that Q, Q' and Q" are all free of a tertiary, carbon atom; and n is an integer of at least 50.

3. The process of claim 2 wherein the alkenyl aromatic monomer is of the formula:

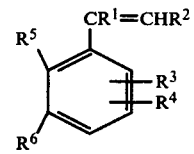

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, halogen and lower alkyl of from 1 to 6 carbon atoms; $R^5$ and $R^6$ are selected from the group consisting of hydrogen and lower alkyl and alkenyl groups of from 1 to 6 carbon atoms or $R^5$ and $R^6$ may be concatenated together with hydrocarbyl groups to form a naphthyl group, said monomer being free of any substituent having a tertiary carbon atom.

4. The process of claim 3 wherein the polyphenylene oxide is poly(2,6-dimethyl-1,4-phenylene oxide).

5. The process of claim 4 wherein the alkenyl aromatic monomer is styrene.

6. The process of claim 5 wherein a monobasic anhydride is employed that is selected from the group consisting of acetic anhydride and benzoic anhydride.

7. The process of claim 5 wherein alumina is employed.

8. The process of claim 5 wherein a mixture of alumina and water is employed.

9. The process of claim 1 wherein rubber is added in the polymerization mixture.

10. The process of claim 1 wherein the rubber is a polybutadiene rubber.

* * * * *

UNITED STATES PATENT AND TRADEMARK OFFICE
CERTIFICATE OF CORRECTION

PATENT NO. : 4,189,417
DATED : February 19, 1980
INVENTOR(S) : John Charles Goossens It is certified that error appears in the above-identified patent and that said Letters Patent are hereby corrected as shown below:

In claim 3, column 6, line 34, delete "halogen" and insert --hydrogen--.

Signed and Sealed this

Twenty-seventh Day of May 1980

[SEAL]

Attest:

Attesting Officer

SIDNEY A. DIAMOND

Commissioner of Patents and Trademarks

UNITED STATES PATENT AND TRADEMARK OFFICE
CERTIFICATE OF CORRECTION

PATENT NO. : 4,189,417
DATED : February 19, 1980
INVENTOR(S) : John Charles Goossens It is certified that error appears in the above—identified patent and that said Letters Patent is hereby corrected as shown below:

In Column 1, line 18, delete "3,357,358" and insert -- 3,257,358 --.

*Signed and Sealed this*

*Ninth* Day of *December 1980*

[SEAL]

*Attest:*

SIDNEY A. DIAMOND

*Attesting Officer*   *Commissioner of Patents and Trademarks*